(12) United States Patent
Choi

(10) Patent No.: US 8,840,261 B2
(45) Date of Patent: Sep. 23, 2014

(54) LAMP SOCKET, BACKLIGHT ASSEMBLY HAVING THE SAME AND DISPLAY DEVICE HAVING THE SAME

(75) Inventor: Jae-Min Choi, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 214 days.

(21) Appl. No.: 13/078,527

(22) Filed: Apr. 1, 2011

(65) Prior Publication Data

US 2011/0242795 A1 Oct. 6, 2011

(30) Foreign Application Priority Data

Apr. 2, 2010 (KR) ........................ 10-2010-0030404

(51) Int. Cl.
| | |
|---|---|
| G09F 13/04 | (2006.01) |
| F21V 21/00 | (2006.01) |
| H01R 33/02 | (2006.01) |
| H01R 33/08 | (2006.01) |

(52) U.S. Cl.
USPC ..................... 362/97.1; 362/217.01; 439/226; 439/232; 439/239

(58) Field of Classification Search
USPC ......... 362/97.1, 376–378, 382; 439/226–239, 439/620.02, 366, 360, 356
See application file for complete search history.

(56) References Cited

U.S. PATENT DOCUMENTS

| | | | | | |
|---|---|---|---|---|---|
| 1,817,543 | A | * | 8/1931 | Ciraolo | 362/217.12 |
| 2,248,598 | A | * | 7/1941 | Yoder | 439/239 |
| 6,692,309 | B1 | * | 2/2004 | Kovacs | 439/699.2 |
| 8,167,451 | B2 | * | 5/2012 | Shimizu | 362/217.09 |
| 2005/0243571 | A1 | * | 11/2005 | Kang et al. | 362/559 |
| 2006/0072322 | A1 | * | 4/2006 | Lee et al. | 362/260 |
| 2006/0279957 | A1 | * | 12/2006 | Kwon et al. | 362/378 |
| 2007/0058376 | A1 | * | 3/2007 | Suzuki | 362/368 |
| 2009/0046462 | A1 | * | 2/2009 | Park et al. | 362/249 |
| 2009/0128734 | A1 | * | 5/2009 | Cho et al. | 349/61 |
| 2009/0268429 | A1 | * | 10/2009 | Hashimoto et al. | 362/97.1 |
| 2010/0195312 | A1 | * | 8/2010 | Ko et al. | 362/97.1 |
| 2010/0267263 | A1 | * | 10/2010 | Kim | 439/226 |

* cited by examiner

*Primary Examiner* — Hargobind S Sawhney
*Assistant Examiner* — Alexander Garlen
(74) *Attorney, Agent, or Firm* — F. Chau & Associates, LLc

(57) ABSTRACT

A lamp socket including a socket terminal, a backlight assembly having the lamp socket and a display device having the backlight assembly are provided. The socket terminal includes a base part, an extending part, a stopper part, an electrode insertion part and a wire connection member. The extending part is extended from the base part, is angled with respect to the base part, and includes a space to receive an electrode of a lamp. The stopper part extends from the extending part and isolates the space at an end of the extending part. The electrode insertion part is extended from the stopper part, wherein application of pressure on the electrode insertion part separates sides of the stopper part to provide access to the space. The wire connection member is extended from the base part.

16 Claims, 10 Drawing Sheets

LAMP SOCKET, BACKLIGHT ASSEMBLY HAVING THE SAME AND DISPLAY DEVICE HAVING THE SAME

CROSS-REFERENCE TO RELATED APPLICATION

The present application claims priority under 35 U.S.C. §119 to Korean Patent Application No. 2010-0030404 filed on Apr. 2, 2010 in the Korean Intellectual Property Office (KIPO), the contents of which are herein incorporated by reference in their entirety.

BACKGROUND

1. Technical Field

Embodiments of the present invention generally relate to a lamp socket, a backlight assembly having the lamp socket and a display device having the lamp socket. More particularly, embodiments of the present invention relate to a lamp socket including a wire connection part, a backlight assembly having the lamp socket and a display device having the lamp socket.

2. Discussion of the Related Art

Backlight assemblies of a liquid crystal display (LCD) device may be classified as either a direct illumination type backlight assembly or an edge illumination type backlight assembly, based on the location of the light source.

The direct illumination type backlight assembly, having a plurality of lamps as light sources, is used to for large sized display devices such as monitors, televisions and digital information displays. 'I' type lamps have been used as light sources for a display device. 'U' type lamps have also been used as light sources. One 'U' type lamp can substitute for two 'I' type lamps without substantial loss of brightness, so that a total number of lamps of a display device using 'U' lamps can be half of that of a display device using 'I' lamps. It is possible to reduce the cost of producing a display device and simplify the assembly process of the display device by substituting 'I' type lamps with 'U' type lamps. A backlight assembly including a lamp socket combined with an electrode portion of the lamp through a fitting combination in order to fix the lamps to the backlight assembly more easily has been developed. The lamp socket electrically connects the lamp to an inverter. The inverter may include an inverter board and a plurality of chips mounted on the inverter board. The lamp is coupled to the lamp socket by pushing the electrode portion of the lamp into a receiving portion of the lamp socket without a further process for coupling, such as soldering. Also, the inverter is coupled to the lamp socket by pushing a coupling portion of the inverter board into a receiving portion of the lamp socket without a further process.

FIG. 8a is a plan view of a conventional backlight assembly with lamps coupled to lamp sockets and FIG. 8b is a plan view showing a lower structure of the backlight assembly of FIG. 8a. Referring to FIG. 8a and FIG. 8b, the inverter board 1200 is coupled to the lamp socket 1100 below the bottom chassis 1300. The inverter board 1200 includes a coupling portion protruding toward a direction where the lamp socket 1100 is disposed and the lamp socket 1100 includes a groove exposed below the bottom chassis 1300. The coupling portion of the inverter board 1200 is inserted into the groove of the lamp socket 1100. The length of the inverter board 1200 is the same as or longer than T. T is defined as the longest length between two lamp sockets 1100. The size of the chips mounted on the inverter board has become smaller, so it is possible to reduce the length of the inverter board. If the length of the inverter board is reduced, the cost of producing or buying the inverter board is reduced and also the total volume of the backlight assembly can be reduced. Accordingly, there is need for a backlight assembly configuration that allows for reduction of the length of the inverter board and that does not require the length of the inverter board to be the same as or longer than the length T and to be coupled to the lamp sockets 1100 as in a conventional backlight assembly.

SUMMARY

Embodiments of the present invention provide a lamp socket including a socket terminal, a backlight assembly having the lamp socket and a display device having the backlight assembly are provided. The socket terminal includes a base part, an extending part, a stopper part, an electrode insertion part and a wire connection member. The extending part is extended from the base part, is angled with respect to the base part, and includes a space to receive an electrode of a lamp. The stopper part extends from the extending part and isolates the space at an end of the extending part. The electrode insertion part is extended from the stopper part, wherein application of pressure on the electrode insertion part separates sides of the stopper part to provide access to the space. The wire connection member is extended from the base part.

BRIEF DESCRIPTION OF THE DRAWINGS

The embodiments of the present disclosure will become more apparent by describing in detail the embodiments thereof with reference to the accompanying drawings, in which:

FIG. 3b is a perspective cross sectional view of the socket housing taken along a line I-I' of FIG. 3a;

FIG. 5b is a rear view of the backlight assembly of FIG. 5a;

DETAILED DESCRIPTION

Figure 1:
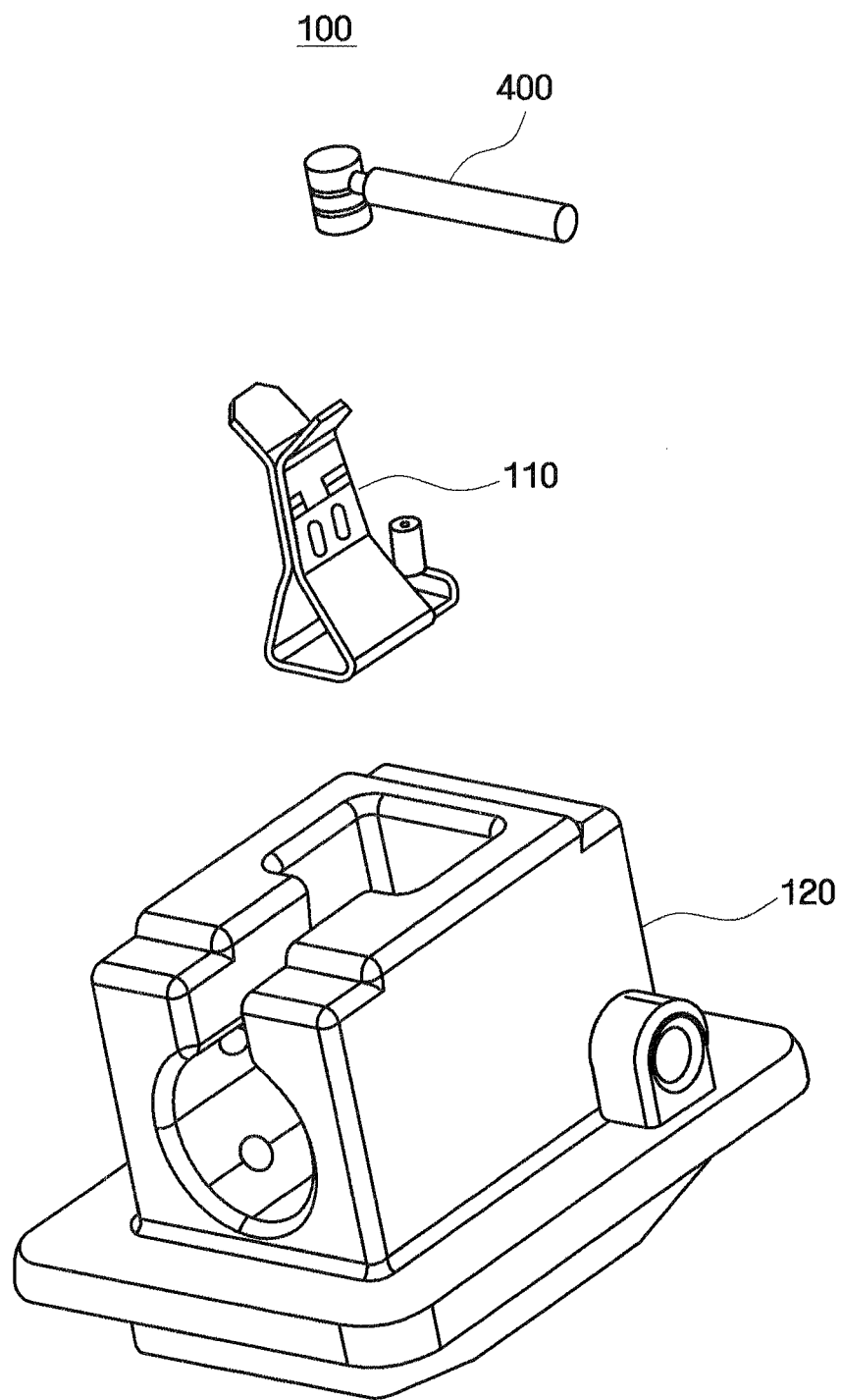
FIG. 1 is an exploded perspective view of a lamp socket in accordance with an embodiment of the present invention.

The disclosure is described more fully hereinafter with reference to the accompanying drawings, in which embodiments of the invention are shown. This disclosure may, however, be embodied in many different forms and should not be construed as limited to the embodiments set forth herein. In the drawings, the size and relative sizes of layers and regions may be exaggerated for clarity.

Hereinafter, embodiments of the present invention will be described in detail with reference to the accompanying drawings.

FIG. 1 is an exploded perspective view of a lamp socket in accordance with an embodiment of the present invention. Referring to FIG. 1, the lamp socket 100 includes a socket terminal 110 and a socket housing 120. The socket terminal 110 can be coupled to an electrode of a lamp. The socket terminal 110 receives power generated by an inverter through a wire 400 connected to an inverter and transfers the power to an electrode of a lamp coupled to the socket terminal 110. The socket housing 120 protects the socket terminal 110 and fixes the lamp socket 100 to a bottom chassis of a backlight assembly.

Figure 2:
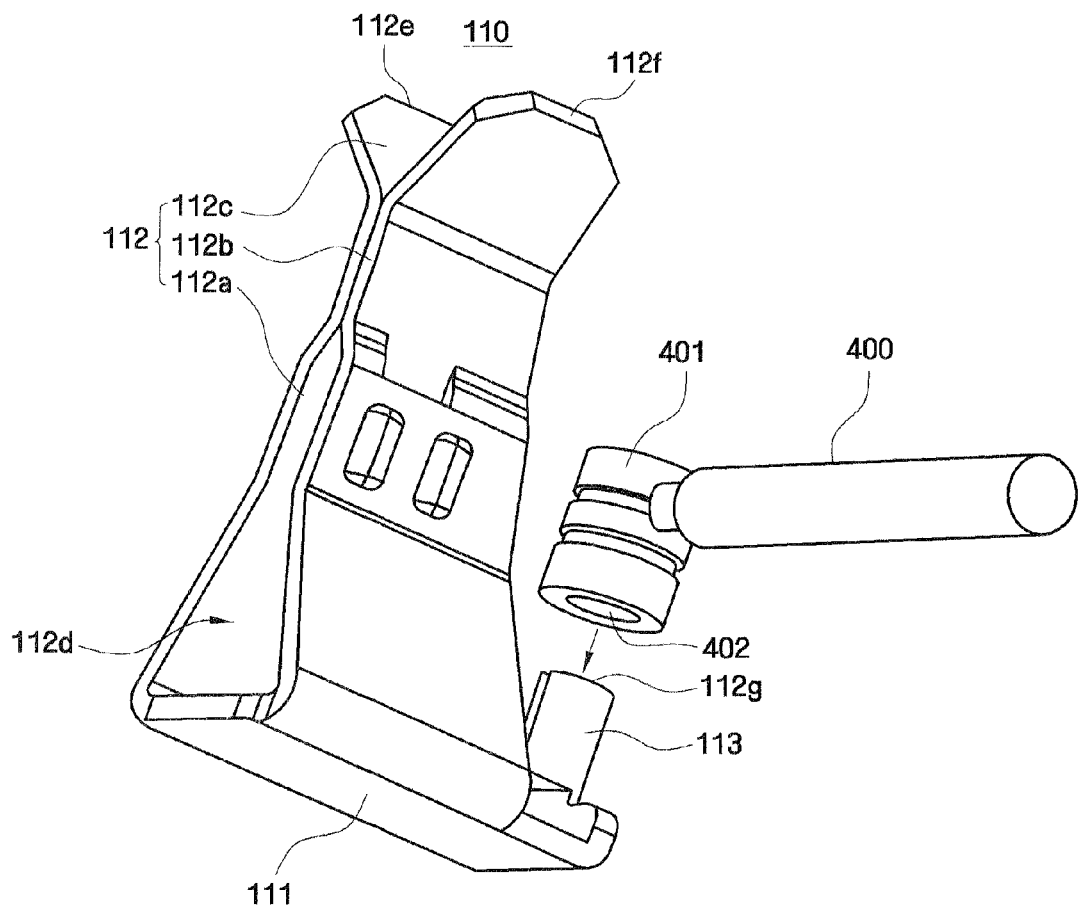
FIG. 2 is a perspective view of the socket terminal of FIG. 1.

FIG. 2 is a perspective view of the socket terminal of FIG. 1. Referring to FIG. 2, the socket terminal 110 includes a base part 111, an electrode connection member 112 and a wire connection member 113. The electrode connection member 112 is extended from the base part 111. The electrode connection member 112 may be formed integrally with the base part 111, and may be formed by various methods. The electrode connection member 112 includes an extending part 112a extended toward an upper area from the base part 111, a stopper part 112b disposed over the extending part 112a and insertion part 112c disposed over the stopper part 112b. The extending part 112a includes a space 112d to receive a lamp electrode. The stopper part 112b isolates the space to prevent the lamp electrode from coming out from the space 112d. The insertion part 112c includes a first end portion 112e inclined toward a first direction and a second end portion 112f inclined toward a second direction, which substantially opposite to the first direction. When inner surfaces of the first end portion 112e and the second end portion 112f are pushed by an external force, such as a jig or a hand, sides of the stopper part are spread apart so that an upper area of the space isolated by the stopper part 112b can be accessed, so that the lamp electrode can be inserted into the space.

The wire connection member 113 is extended from the base part 111. The wire connection member 113 may be integrally formed with base part 111. Referring to FIG. 2, the wire connection member 113 includes protrusion 112g extended from and angled with respect to the base part 111. The protrusion 112g is, for example, is perpendicular to or substantially perpendicular to the base part 111. The wire 400 includes a connection terminal 401 having a recess 402 corresponding to the protrusion 112g. The protrusion 112g of the wire connection member 113 is inserted to the recess 402 of the connectional terminal 401. The wire connection member 113 may be formed by cutting an area of the base part 111 by a predetermined length, rolling the cut area to form a column shape and bending it in an upward direction with respect to the base part 111. With this structure, a contact area between the wire connection member 113 and the connection terminal 401 is increased, so mechanical stability is also increased. Alternatively, the wire connection member 113 may include a recess and the connection terminal 401 may includes a corresponding protrusion which fits into the recess.

Figure 3A:
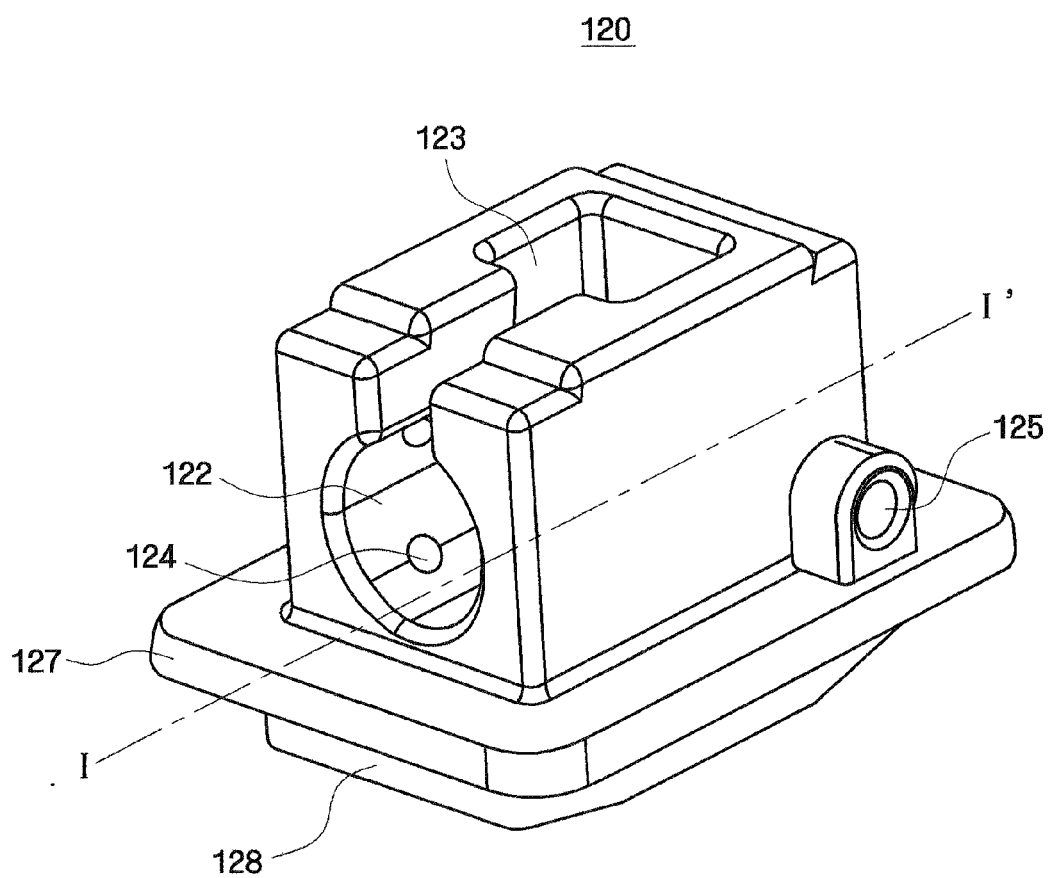
FIG. 3a is a perspective view of the socket housing of FIG. 1.
Figure 3B:
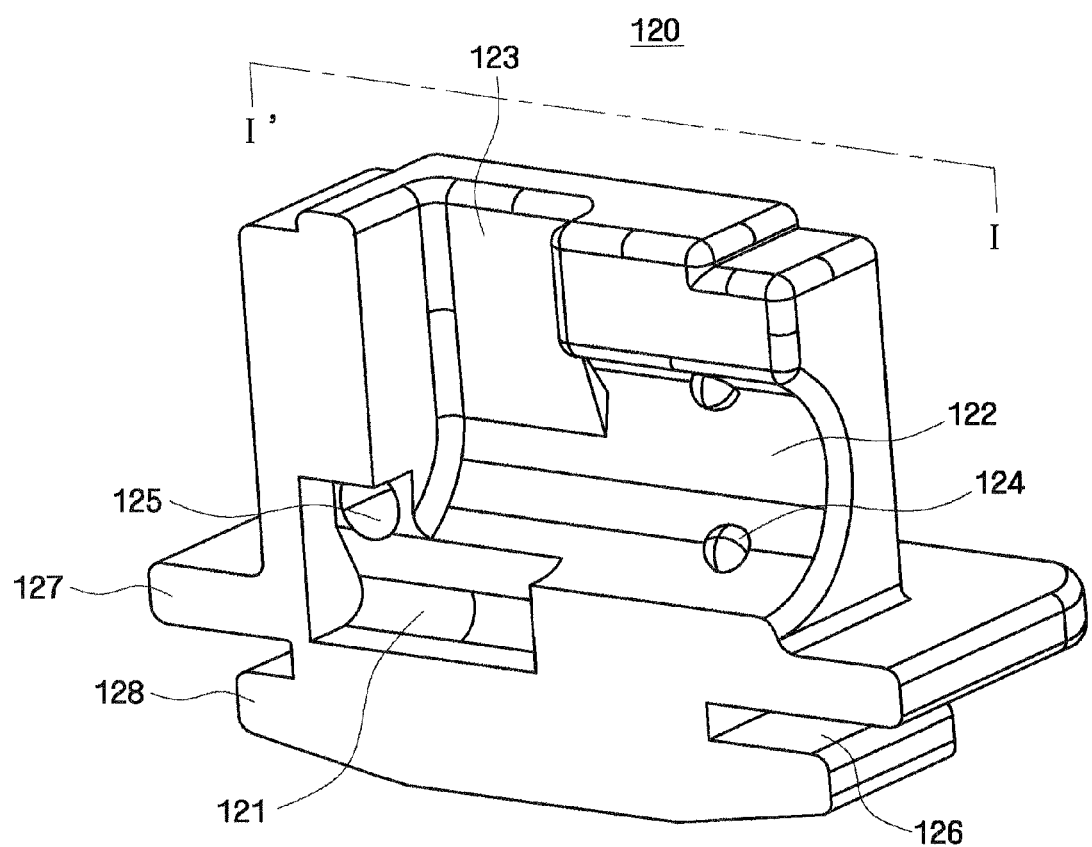

FIG. 3a is a perspective view of the socket housing of FIG. 1 and FIG. 3b is a perspective cross sectional view of socket housing taken along a line I-I' of FIG. 3a. Referring to FIGS. 3a and 3b, the socket housing 120 includes a socket terminal receiving portion 121, a lamp insertion portion 123, a lamp supporting recess 122, a wire insertion portion 125 and a socket housing fixing portion 126. The socket terminal receiving portion 121 comprise a recess corresponding to the shape of the base part 111. The socket terminal 110 is received to the socket terminal receiving portion 121. The socket terminal 110 may include an additional protrusion and the socket housing 120 may include a recess to receive the additional protrusion to fix the socket terminal 110 to the socket housing 120 with increased stability. An end portion of the lamp is inserted to socket housing 120 through the lamp insertion portion 123. The insertion part 112c of the socket terminal is exposed to an upper area through the lamp insertion portion 123. The lamp supporting recess 122 is formed from a front portion of the socket housing 120 and supports the lamp inserted therein. According to an embodiment, a lamp supporting protrusion 124 is formed on an inner surface of the lamp supporting recess 122 to reduce the contact area between the lamp and the socket housing 120 for preventing heat loss of the lamp. According to an embodiment, the socket housing fixing portion 126 is a recess formed on a side of the socket housing 120. The bottom chassis of the backlight assembly includes socket receiving hole and the socket housing fixing portion 126 engages a rim of the socket receiving hole to fix socket housing 120 to the bottom chassis after the socket housing 120 is inserted in the socket receiving hole. As a result, the socket housing 120 can be fixed to the bottom chassis without an additional fixing unit. The socket housing 120 may further include a first plate 127 disposed over the socket housing fixing portion 126 and a second plate 128 disposed below the socket housing fixing portion 126. The first plate 127 contacts an inner surface of the bottom chassis and the second plate 128 contacts an outer surface of the bottom chassis. The first and second plates 127, 128 enable the socket housing 120 to be strongly fixed to the bottom chassis and prevent particles from being inserted into the bottom chassis through the socket receiving hole.

The socket housing 120 comprises a non conductive material to prevent an electric current of the socket terminal 110 from being leaked to the bottom chassis.

The socket housing 120 also comprises a flexible and elastic material, such as silicon, rubber, plastic material, to buffer external forces transferred to the lamp and to facilitate the assembly process of the lamp socket 100. A width of an area of the lamp insertion portion 123 corresponding to the lamp supporting recess 122 may be smaller than the diameter of the lamp due to the flexibility and elasticity of the socket housing 120.

The wire insertion portion 125 is formed on a side of the socket housing 120. The wire insertion portion 125 comprises a hole or groove. An inlet of the wire insertion portion 125 formed on an inner surface of the socket housing 120 is adjacent to the socket terminal receiving portion 121 to guide the wire 400 connected to the socket terminal 110 to an external area of the socket housing 120. An outlet of the wire insertion portion 125 is formed over the socket housing fixing portion 126 to guide the wire 400 to an inner area of the bottom chassis. A backlight assembly with a plurality of lamps includes a plurality of wires 400. If the wires 400 are exposed to a rear surface of the bottom chassis after exiting each socket housing 120, the possibility of being damaged by unexpected contact with other units or equipments will be increased. Also the rear surface of the backlight assembly can be complicated with a plurality of wires. According to an embodiment of the invention, the wires 400 are guided and gathered inside of the bottom chassis to reduce the possibility of damage to the wires 400.

Figure 4:
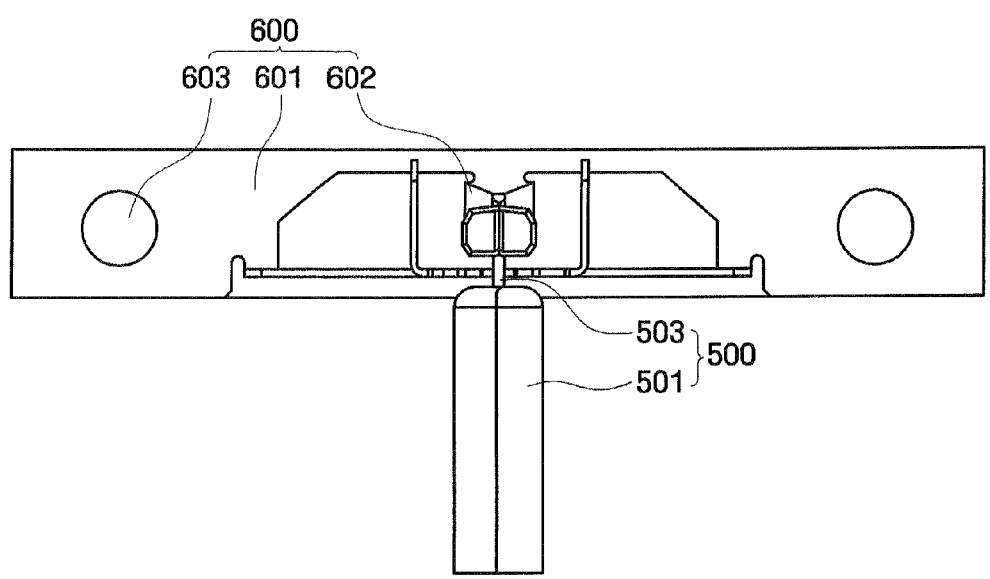
FIG. 4 is a plan view of a ground socket and a lamp coupled to the ground socket in accordance with an embodiment of the present invention.

FIG. 4 is a plane view of a ground socket and a lamp coupled to the ground socket in accordance with an embodiment of the present invention. The ground socket 600 includes a plate 601, a ground terminal 602 protruded from the plate 601 to an upper area and a fixing hole 603 formed on the plate 603. The ground socket 600 is applicable to a single electrode driving type backlight assembly which supplies power to only one electrode of a lamp. The ground socket 602 fixes the ground electrode 503 of the lamp 500 and is coupled to the bottom chassis through a fixing member, such as a screw or bolt, which passes through the fixing hole 603 formed on the plate 601. With this structure, the ground electrode 503 is grounded to the bottom chassis by the ground socket 600.

Figure 5A:
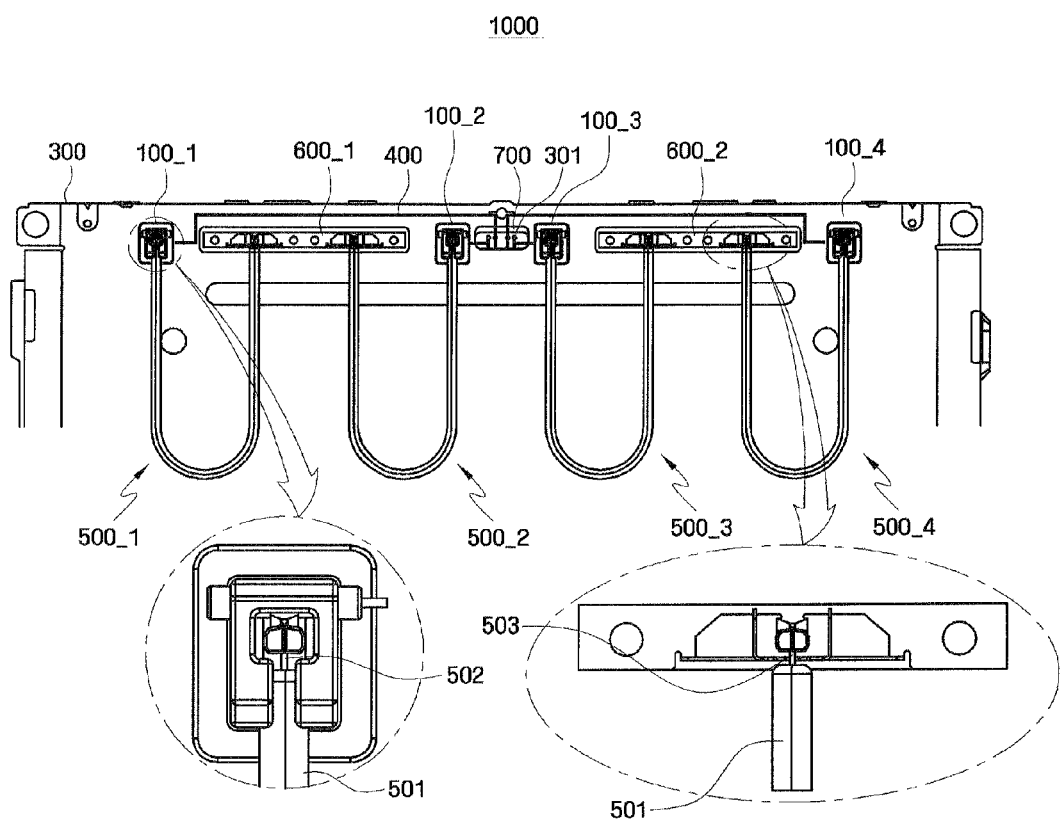
FIG. 5a is a plan view of a backlight assembly with a plurality of lamps coupled to a lamp socket and a ground socket and received in a bottom chassis in accordance with an embodiment of the present invention.
Figure 5B:
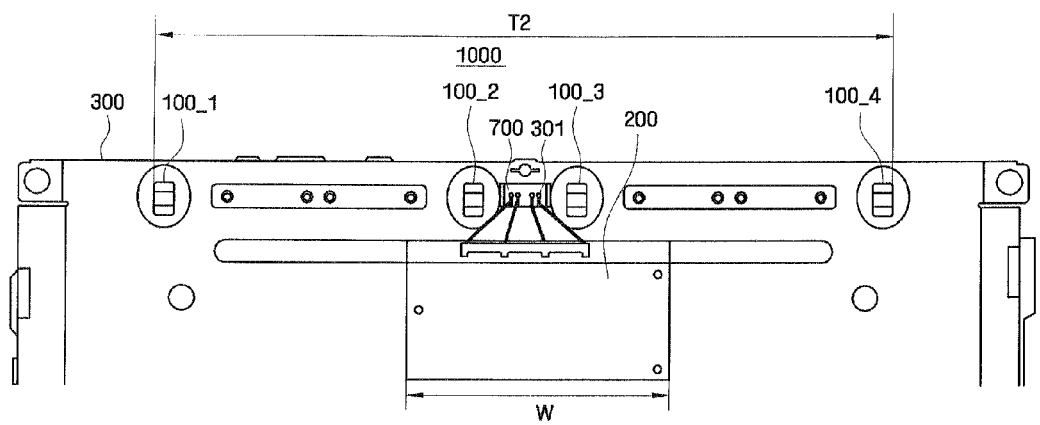

FIG. 5a is a plane view of a backlight assembly 1000 including a plurality of lamps 500_1, 500_2, 500_3, and 500_4 coupled to lamp sockets 100_1, 100_2, 100_3, and 100_4 and ground sockets 600_1 and 600_2 and received in the bottom chassis 300 in accordance with an embodiment of the present invention. FIG. 5b is a rear view of the backlight assembly 1000 of FIG. 5a.

Each of the lamps 500_1, 500_2, 500_3, and 500_4 includes a U-shaped body 501, a first electrode 502 receiving power and a ground electrode 503. Each of the lamp sockets 100 receives the first electrode 502 and an end portion of the body 501 adjacent to the first electrode 502. The ground socket 600 receives the ground electrode 503. According to an embodiment, another end portion of the body 501 adjacent to the ground electrode 503 is supported by an additional supporting unit formed on the ground socket 600 or a lamp supporter disposed adjacent to the ground socket 600.

The inverter board 200 is disposed below the rear surface of the bottom chassis 300. The wires 400 connected to the socket terminals 110 of the lamp sockets 100 are drawn out to the rear surface of the bottom chassis 300 and connected to the inverter board 200. The wires 400 may be connected to the inverter board 200 by various connecting methods.

According to an embodiment of the invention, the ground electrodes 503 of the adjacent lamps 500 disposed on the bottom chassis 300 (e.g., lamps 500_1 and 500_2) are adjacent to each other. The power generated by the inverter board 200 is not provided to the ground electrodes 503. As a result, it is possible to hold a plurality of ground electrodes 503 of different lamps by one ground socket 600. For example, the ground electrodes 503 of lamps 500_1 and 500_2 are received by ground socket 600_1, and the ground electrodes 503 of lamps 500_3 and 500_4 are received by ground socket 600_2. As a result, it is possible to reduce the number of ground sockets 600 according to an embodiment of the invention.

A wire guide 700 may be fixed in or adjacent a hole 301 in the bottom chassis to guide the wires 400. The wire guide 700 includes a plurality of guide grooves to guide the wires 400. The wire guide grooves are recessed from a side surface of the wire guide 700, so the wires 400 may be inserted in the wire guide 700. The wire guide 700 prevents the wires 400 from being damaged by sharp edges of the hole 301 in the bottom chassis 300 and from being twisted. The wires 400 may be guided by the wire guide 700 by adjusting a shape and a guiding direction of the wire guide grooves. The wire guide 700 comprises a flexible and elastic material, such as silicon, rubber or plastic material.

According to embodiments of the present invention, a reflector sheet may be disposed between the bottom chassis 300 and the lamp 500. Optical units such as diffuser sheets, prism sheets and a diffuser plate may be disposed over the lamp 500. A first frame may be disposed on the bottom chassis 300 to support the optical units. A display panel is disposed over the optical units. A second frame may be disposed between the display panel and the optical units to support a display panel. A top chassis may be disposed over the display panel to protect the peripheral area of the display panel and is coupled to the bottom chassis 310.

Figure 6:
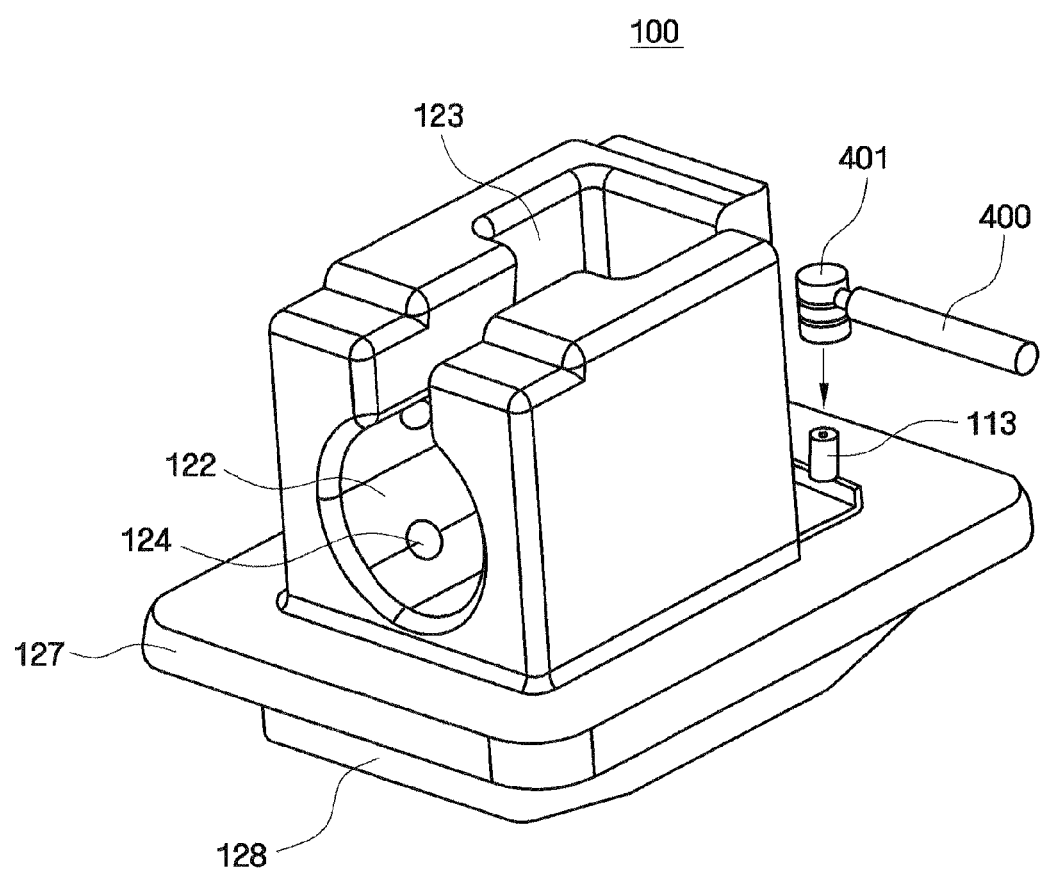
FIG. 6 is a perspective view of a lamp socket in accordance with an embodiment of the present invention.

FIG. 6 is a perspective view of a lamp socket 100 in accordance with an embodiment of the present invention. Referring to FIG. 6, a portion of the socket housing 120 surrounding the lamp insertion portion 123 is removed, and the wire connection member 113 of the socket terminal 110 is exposed to the outside of the socket housing 120. With this structure, the socket housing 120 does not surround the wire 400, so as to facilitate coupling and separation of the wire 400 to and from the wire connection member 113.

Figure 7:
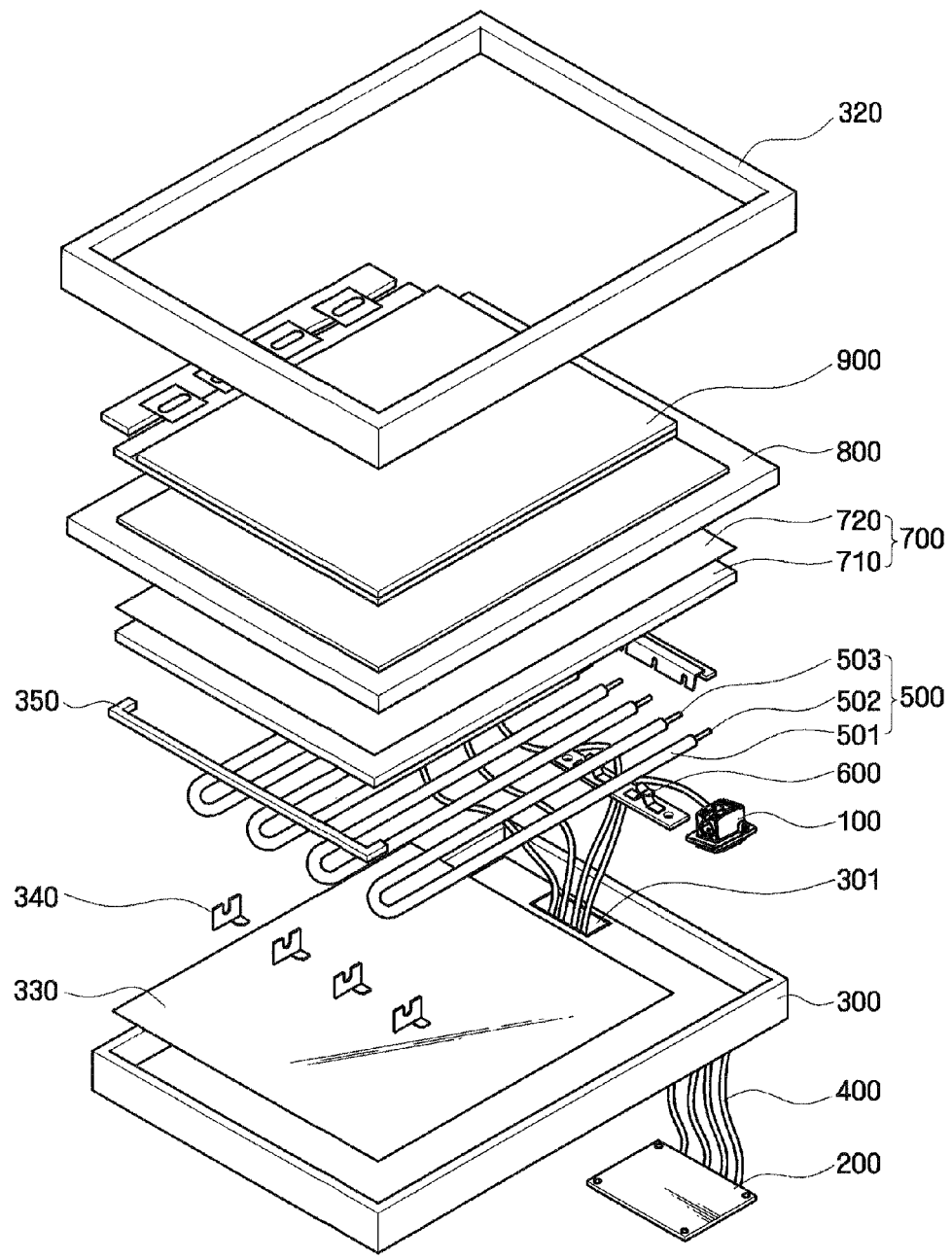
FIG. 7 is an exploded perspective view of a display device in accordance with an embodiment of the present invention.
Figure 8A:
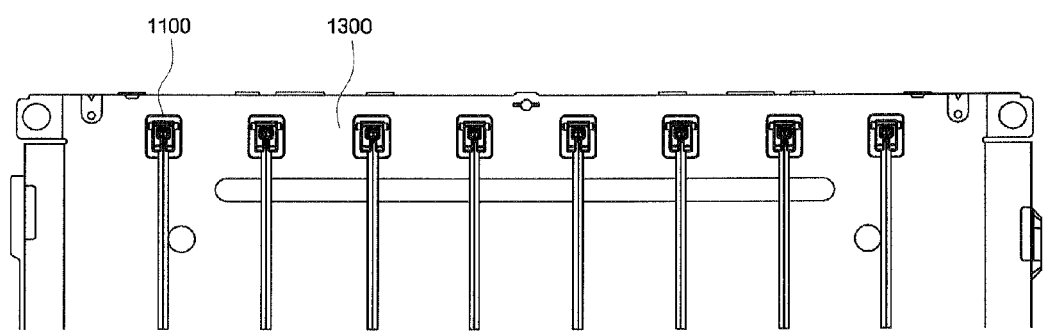
FIG. 8a and FIG. 8b are plan views of a conventional backlight assembly including lamps and an inverter board.
Figure 8B:
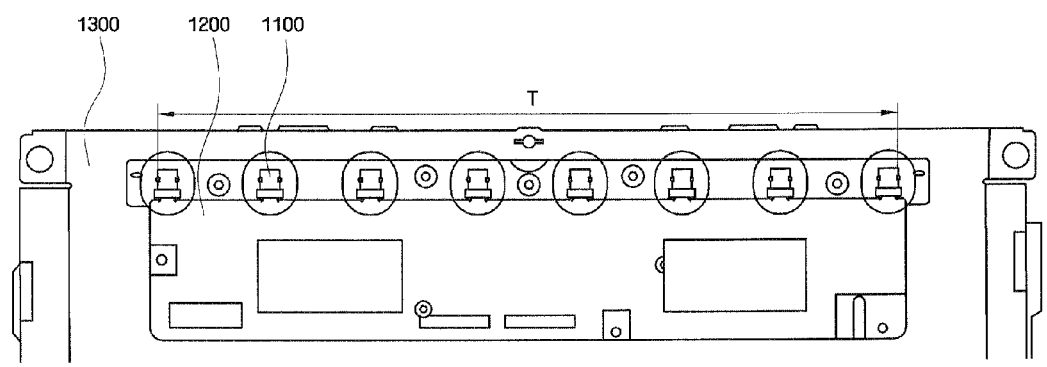

FIG. 7 is an exploded perspective view of a display device in accordance with an embodiment of the present invention. Referring to FIG. 7, the display device includes a plurality of U-shaped lamps 500, a bottom chassis 300, an inverter board 200, at least one lamp socket 100, at least one ground socket 600, a wires 400, a light guiding member 700, a display panel 900 and a top chassis 320.

The lamps 500 are received in the bottom chassis 300. According to an embodiment, the lamps 500 are fixed to the bottom chassis 300 by lamp supporters 340. The lamp supporters 340 receive a curved portion of the body 501 of the lamp 500.

The first electrode 502 of a first lamp 500 is coupled to the lamp socket 100 and the ground electrodes 503 of at least two adjacent lamps are coupled to the ground socket 600. A reflector sheet 330 may be disposed between the lamp 500 and the bottom chassis 300.

An upper area of the curved portion of the body 501 of the lamp 500, the first electrode 502 coupled to the lamp socket 100 and the ground electrodes 503 coupled to the lamp socket 600 may be further supported by a side mold frame 350. The side mold frame 350 supports the curved portions and/or end portions of the lamps 500 and includes an inclined surface reflecting light emanating from side surfaces of the lamps 500 to an upper area of the display device for increasing efficiency of the light provided by the lamps 500. The side mold frame 350 may support peripheral area of the light guiding member 700 to receive the light guiding member 700 in the bottom chassis 300.

The light guiding member 700 may include one or more optical sheets 720 and an optical plate 710 for increasing brightness and uniformity of light provided by the lamps 500.

A middle mold frame 800 is disposed over the optical sheets 720. The middle mold frame 800 is coupled to the bottom chassis 300 and covers peripheral areas of the optical sheets 720.

The display panel 900 is disposed on the middle mold frame 800 and receives light provided by the lamps 500 and guided by the light guiding member 700.

The top chassis 320 is disposed over the display panel 900. The top chassis covers peripheral areas of the display panel 900 and is coupled to the bottom chassis 300.

The inverter board 200 is disposed below the bottom chassis 300 and fixed to a rear surface of the bottom chassis 300. Ends of the wires 400 are connected to the wire connection members 113 and the other ends of the wires 400 are connected the inverter board 200. As a result, power for driving the lamps 500 generated by the inverter board 200 can be provided to the first electrodes 502 through the wires 400 and the socket terminals. All the wires 400 connected to the lamp sockets 100 are gathered in an inner area of the bottom chassis 300, come out of the bottom chassis 300 through the hole 301, and are connected to the inverter board 200 disposed below the bottom chassis 300.

This disclosure has been described with reference to exemplary embodiments. However, modifications and variations will be apparent to those skilled in the art in light of the foregoing description. Accordingly, the present disclosure embraces all such modifications and variations that fall within the spirit and scope of the appended claims.

What is claimed is:

1. A backlight assembly comprising:
a bottom chassis including a first hole and a second hole;
a first lamp socket including a first socket housing and a first socket terminal received in the first socket housing, wherein the first socket terminal includes a first wire connection member, and the first lamp socket is fixed in the first hole;
a ground socket including a plate, a first ground terminal and a second ground terminal;
a first lamp including a U-shaped body, a first electrode, and a first ground electrode, wherein the first electrode is received in the first lamp socket and the first ground electrode is received in the first ground terminal;
an inverter board disposed below the bottom chassis;
a first wire including a first end connected to the first wire connection member, a body portion of the first wire passing through the second hole and a second end connected to the inverter board;
a second lamp socket including a second socket housing and a second socket terminal received in the second socket housing, wherein the second socket terminal includes a second wire connection member, wherein the first and second ground terminals are disposed between the first and second lamp sockets;
a second lamp including a U-shaped body, a second electrode and a second ground electrode, wherein the second electrode is received in the second lamp socket and the second ground electrode is received in the second ground terminal; and
a second wire including a first end connected to the second wire connection member, a body portion of the second wire passing through the second hole and a second end connected to the inverter board.

2. The backlight assembly of claim 1, wherein the first socket housing comprises a wire insertion portion, and the body portion of the first wire passes through the wire insertion portion.

3. The backlight assembly of claim 2, further comprising a wire guide fixed in or adjacent the second hole and guiding the body portions of the first and second wires from an inner area of the bottom chassis to an outer area of the bottom chassis.

4. The backlight assembly of claim 3, wherein part of the body portion of the first wire is disposed on a peripheral area of the bottom chassis.

5. The backlight assembly of claim 3, wherein the wire guide comprises one of silicon, rubber or plastic.

6. The backlight assembly of claim 1, wherein the first socket housing comprises one of silicon, rubber or plastic.

7. The backlight assembly of claim 1, wherein the first socket housing comprises:
a socket terminal receiving portion to receive the first socket terminal;
a lamp insertion portion recessed from an upper surface of the first socket housing;
a lamp supporting recess formed from a front portion of the first socket housing to support a part of a lamp accommodated in the lamp supporting recess;
a wire insertion portion formed on a side of the first socket housing; and
a recess formed below the wire insertion portion and engaging an end of the first hole.

8. The backlight assembly of claim 1, wherein the first socket terminal comprises:
a base part;
an extending part extended from the base part, wherein the extending part is at an angle with respect to the base part and forms a space to receive an electrode of a lamp;
a stopper part extending from the extending part, wherein the stopper part isolates the space at an end of the extending part;
an electrode insertion part extended from the stopper part, wherein application of pressure on the electrode insertion part separates sides of the stopper part to provide access to the space; and
the first wire connection member extended from the base part.

9. The backlight assembly of claim 8, wherein the first wire connection member comprises a protrusion extended from and positioned at an angle with respect to the base part.

10. The backlight assembly of claim 9, wherein the first wire further comprises a connection terminal including a recess to receive the protrusion.

11. A display device comprising:
a bottom chassis including a first hole and a second hole;
a first lamp socket including a first socket housing and a first socket terminal received in the first socket housing, wherein the first socket terminal includes a first wire connection member, and the first lamp socket is fixed in the first hole;
a ground socket including a plate, a first ground terminal and a second ground terminal;
a first lamp including a U-shaped body, a first electrode, and a first ground electrode, wherein the first electrode is received in the first lamp socket, and the first ground electrode is received in the first ground terminal;
an inverter board disposed below the bottom chassis;
a first wire including a first end connected to the first wire connection member, a body portion of the first wire passing through the second hole and a second end connected to the inverter board;
a second lamp socket including a second socket housing and a second socket terminal received in the second socket housing, wherein the second socket terminal includes a second wire connection member, wherein the first and second ground terminals are disposed between the first and second lamp sockets;
a second lamp including a U-shaped body, a second electrode and a second ground electrode, wherein the second electrode is received in the second lamp socket and the second ground electrode is received in the second ground terminal;
a second wire including a first end connected to the second wire connection member, a body portion of the second wire passing through the second hole and a second end connected to the inverter board;
an optical unit disposed over the lamps;
a frame covering a peripheral area of the optical unit;
a display panel disposed on the frame; and
a top chassis covering a peripheral area of the display panel and coupled to the bottom chassis.

12. The display device of claim 11, wherein the first socket housing comprises a wire insertion portion, and the body portion of the first wire passes through the wire insertion portion.

13. The display device of claim 12, further comprising a wire guide fixed in or adjacent the second hole and guiding the body portions of the first and second wires from an inner area of the bottom chassis to an outer area of the bottom chassis.

14. The display device of claim 13, wherein part of the body portion of the first wire is disposed on a peripheral area of the bottom chassis.

15. The display device of claim 11, wherein the first wire connection member includes a protrusion extended from the socket terminal, wherein the first wire further comprises a connection terminal including a recess to receive the protrusion.

16. A backlight assembly comprising:
a bottom chassis;
a plurality of lamp sockets, each lamp socket including a socket housing and a socket terminal received in the socket housing, wherein the socket terminal includes a wire connection member;
a ground socket including a plurality of ground terminals; and
a plurality of lamps, each lamp including a U-shaped body, a first electrode, and a ground electrode, wherein the first electrode of a first lamp is received in a first lamp socket, the first electrode of a second lamp is received in a second lamp socket, wherein first and second ground terminals of the ground socket are disposed between the first and second lamp sockets, and the ground electrodes of the first and second lamps which are adjacent to each other are respectively received in the first and second ground terminals of the ground socket, wherein the backlight assembly further comprises:
an inverter board disposed below the bottom chassis;
a first wire including a first end connected to the wire connection member of a first lamp of the plurality of lamps, the first wire including a body portion passing through a hole in the bottom of the chassis and a second end connected to the inverter board; and
a second wire including a first end connected to the wire connection member of a second lamp of the plurality of lamps, the second wire including a body portion passing through the hole in the bottom of the chassis and a second end connected to the inverter board.

* * * * *